United States Patent
Shibuya et al.

(10) Patent No.: US 11,971,568 B2
(45) Date of Patent: Apr. 30, 2024

(54) POLARIZING PLATE, MANUFACTURING METHOD THEREOF, AND OPTICAL DEVICE

(71) Applicant: Dexerials Corporation, Tokyo (JP)

(72) Inventors: Kazuyuki Shibuya, Tokyo (JP); Shigeshi Sakakibara, Tokyo (JP); Toshiaki Sugawara, Tokyo (JP); Yusuke Matsuno, Tokyo (JP); Akio Takada, Tokyo (JP)

(73) Assignee: Dexerials Corporation, Tokyo (JP)

( * ) Notice: Subject to any disclaimer, the term of this patent is extended or adjusted under 35 U.S.C. 154(b) by 768 days.

(21) Appl. No.: 17/058,396

(22) PCT Filed: May 20, 2019

(86) PCT No.: PCT/JP2019/019893
§ 371 (c)(1),
(2) Date: Nov. 24, 2020

(87) PCT Pub. No.: WO2019/230475
PCT Pub. Date: Dec. 5, 2019

(65) Prior Publication Data
US 2021/0199869 A1 Jul. 1, 2021

(30) Foreign Application Priority Data
May 31, 2018 (JP) .................................. 2018-105395

(51) Int. Cl.
*G02B 5/30* (2006.01)
(52) U.S. Cl.
CPC .................. *G02B 5/3058* (2013.01)
(58) Field of Classification Search
CPC .. G02B 5/3058; G02B 5/3025; G02B 5/3033; G02B 5/3041; G02B 5/30
(Continued)

(56) References Cited

U.S. PATENT DOCUMENTS

2006/0087602 A1  4/2006 Kunisada et al.
2007/0242187 A1* 10/2007 Yamaki ................ G02B 5/3058
                                                  359/487.03
(Continued)

FOREIGN PATENT DOCUMENTS

CN    105388551 A    3/2016
CN    107407770 A    11/2017
(Continued)

OTHER PUBLICATIONS

Office Action issued in Chinese Application No. 201980032810.6; dated Nov. 25, 2021 (22 pages).
(Continued)

Primary Examiner — Jade R Chwasz
(74) Attorney, Agent, or Firm — Osha Bergman Watanabe & Burton LLP

(57) ABSTRACT

A polarizing plate may have high transmittance characteristics and suppressed reflected light. An optical device may be provided with the polarizing plate. The polarizing plate may have a wire grid structure that includes a transparent substrate and grid-like projection portions arranged on the transparent substrate at a pitch shorter than the wavelength of light in a used bandwidth and extending in a predetermined direction. The grid-like projection portions may each have a reflective layer and a dielectric layer in order from the transparent substrate side. When viewed from the predetermined direction, the reflective layer has may have a step on the side thereof and may have the largest bottom width on the transparent substrate side.

9 Claims, 12 Drawing Sheets

(58) Field of Classification Search
USPC .................................................... 359/485.05
See application file for complete search history.

(56) References Cited

U.S. PATENT DOCUMENTS

| | | | |
|---|---|---|---|
| 2011/0170186 A1 | 7/2011 | Sawaki | |
| 2013/0215507 A1* | 8/2013 | Sasaki ...................... | G02B 1/14 359/485.05 |
| 2013/0215508 A1 | 8/2013 | Sasaki | |
| 2014/0293142 A1* | 10/2014 | Kawazu ............ | G02F 1/133536 359/485.05 |
| 2016/0054497 A1* | 2/2016 | Takahashi ............ | G02B 5/3058 216/13 |
| 2018/0081103 A1 | 3/2018 | Takeda | |
| 2018/0180785 A1 | 6/2018 | Takeda | |
| 2018/0252854 A1* | 9/2018 | Takahashi ............ | G02B 5/3058 |
| 2021/0208323 A1* | 7/2021 | Shibuya ............... | G02B 5/3058 |

FOREIGN PATENT DOCUMENTS

| | | | | |
|---|---|---|---|---|
| JP | 2006-126338 A | | 5/2006 | |
| JP | 2009069809 A | * | 4/2009 | ........... G02B 27/285 |
| JP | 2010-530994 A | | 9/2010 | |
| JP | 2011-39351 A | | 2/2011 | |
| JP | 2011-141468 A | | 7/2011 | |
| JP | 2011-154143 A | | 8/2011 | |
| JP | 2013-167823 A | | 8/2013 | |
| JP | 2013-167824 A | | 8/2013 | |
| JP | 2015-212741 A | | 11/2015 | |
| JP | 2016-45345 A | | 4/2016 | |
| JP | 2016-212156 A | | 12/2016 | |
| JP | 6230689 B1 | | 11/2017 | |
| WO | 2017/073266 A1 | | 5/2017 | |
| WO | WO-2017073266 A1 | * | 5/2017 | ........... G02B 5/3041 |

OTHER PUBLICATIONS

International Search Report issued in Application No. PCT/JP2019/019893, dated Jul. 30, 2019 (5 pages).
Written Opinion issued in International Application No. PCT/JP2019/019893, dated Jul. 30, 2019 (5 pages).
Notice of Reasons for Refusal issued in Japanese Application No. 2018-105395, dated Jul. 31, 2018 (4 pages).
Notice of Reasons for Refusal issued in Japanese Application No. 2018-105395, dated Jan. 22, 2019 (2 bages).
Notice of Reasons for Refusal issued in Japanese Application No. 2018-105395, dated Jan. 28, 2020 (3 pages).
Notice of Reasons for Refusal issued in Japanese Application No. 2018-105395, dated Jun. 2, 2020 (2 pages).
Notice of Reasons for Refusal issued in Japanese Application No. 2018-105395, dated Sep. 1, 2020 (2 pages).
Notification of Reasons for Refusal issued in the Japanese Application No. 2020-056495, dated Feb. 22, 2022 (11 pages).
Office Action issued in the counterpart Japanese Patent Application No. 2020-056495, dated Aug. 9, 2022 (7 pages).
Office Action issued in Chinese Application No. 201980032810.6; dated Aug. 1, 2022 (18 pages).

* cited by examiner

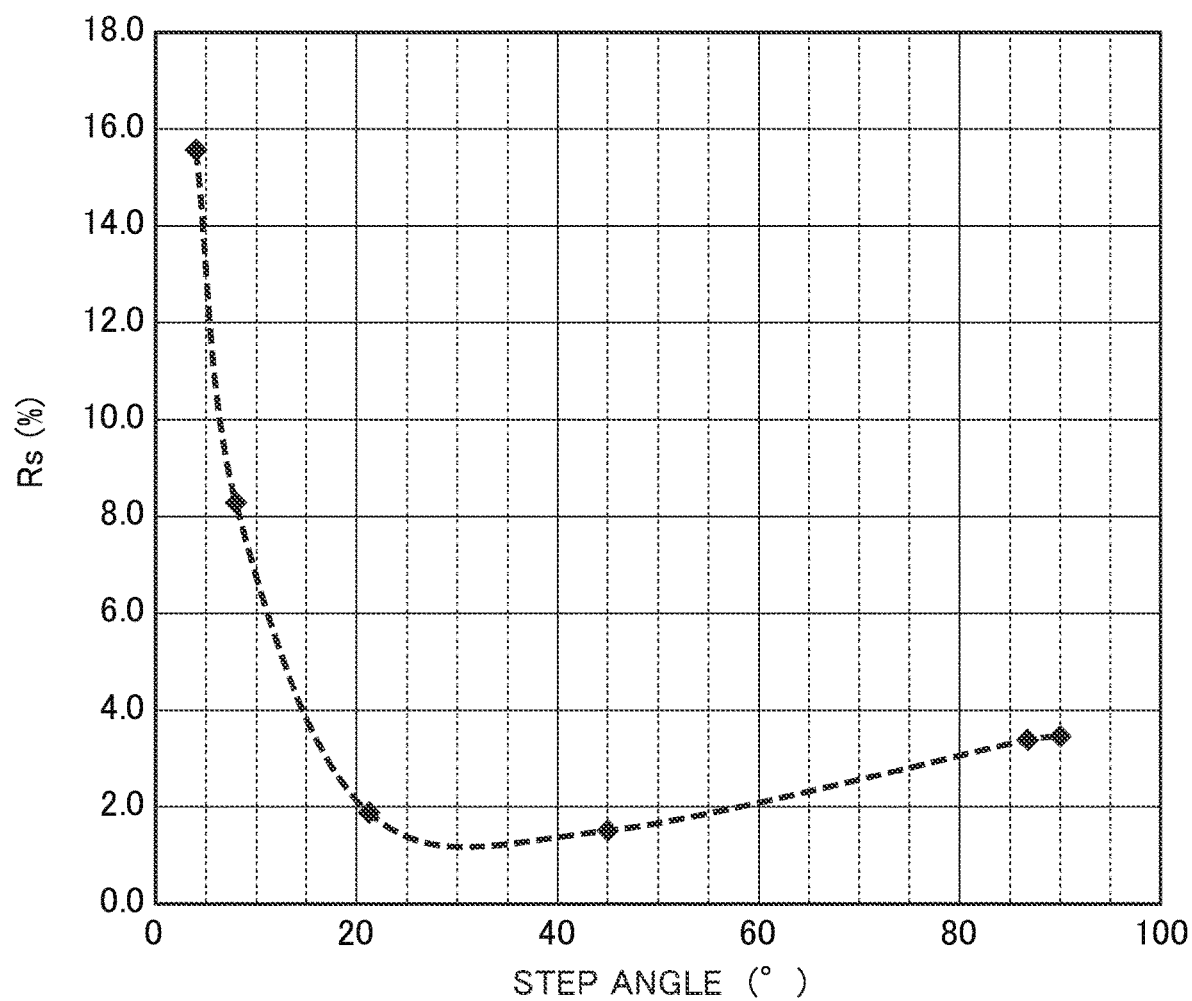

POLARIZING PLATE, MANUFACTURING METHOD THEREOF, AND OPTICAL DEVICE

TECHNICAL FIELD

The present invention relates to a polarizing plate, a manufacturing method thereof and an optical device.

BACKGROUND ART

Conventionally, as an polarizing element, an absorption type wire grid polarizing element has been proposed that is achieved by forming, on a substrate, a metal grid having a pitch shorter than the wavelength of light in a used bandwidth, and further forming a dielectric layer, and an inorganic particulate layer on the metal grid to thereby cancel light reflected by the metal grid through an interference effect and to transmit part of the incident light.

For such a polarizing element, with improvement in luminance and definition of liquid crystal projectors, the demand for further reduction in reflectance has been increasing. A high reflectance may cause a malfunction of a liquid crystal panel, and degrades the image quality owing to stray light.

Here, the reflectance is determined by interference between layers constituting the grid structure, and by absorption in the layers. A method of controlling the reflectance by adopting a material meeting the demand as the dielectric layer or the like, has been proposed (see Patent Document 1). However, in Patent Document 1, each layer is designed to have a rectangular shape. Accordingly, it is difficult to form a perfect rectangle in a nano level, thereby causing a situation where material design in consideration of the shape is significantly difficult.

A method of controlling the reflectance characteristics by forming a fine pattern on a base material made of a resin before forming a metal layer to control the reflectance and the wavelength of the base material has been proposed (see Patent Document 2). Unfortunately, the base material adopted in Patent Document 2 is made of a resin. Accordingly, the heat resistance, and the light resistance are inferior to those of a wire grid polarizing element made of an inorganic material. There are concerns about long-term use in a high-intensity light environment.

Patent Document 1: Japanese Unexamined Patent Application (Translation of PCT Application), Publication No. 2010-530994 Patent Document 2: Japanese Unexamined Patent Application, Publication No. 2015-212741

DISCLOSURE OF THE INVENTION

Problems to be Solved by the Invention

The present invention has been made in view of the background art described above, and has an object to provide a polarizing plate that is excellent in controlling the reflectance characteristics, and has excellent selective absorptivity, and a manufacturing method thereof, and an optical device provided with the polarizing plate. More specifically, a polarizing plate with reflection in the absorption axis direction being suppressed, and a manufacturing method thereof, and an optical device provided with the polarizing plate are to be provided.

Means for Solving the Problems

The present inventors have found out that if a polarizing plate has a wire grid structure including: a transparent substrate; and grid-like projection portions that are arranged on the transparent substrate at a pitch shorter than a wavelength of light in a used bandwidth, and extend in a predetermined direction, the grid-like projection portions are each provided with a reflective layer, and with a dielectric layer in order from the transparent substrate side, and the shape of the reflective layer viewed in the predetermined direction is specified, a polarizing plate having excellent selective absorptivity can be obtained. The present invention has thus been completed.

That is, the present invention is a polarizing plate (e.g., a polarizing plate 10 described later) having a wire grid structure, the plate including: a transparent substrate (e.g., a transparent substrate 1 described later); and grid-like projection portions (e.g., grid-like projection portions 20 described later) that are arranged on the transparent substrate at a pitch shorter than a wavelength of light in a used bandwidth, and extend in a predetermined direction, the grid-like projection portions each having a reflective layer (e.g., a reflective layer 3 described later), and a dielectric layer (e.g., a dielectric layer 4 described later) in order from the transparent substrate side, the reflective layer, when viewed in the predetermined direction, having at least one step on a side thereof, and having the largest bottom width on the transparent substrate side.

The step may be formed of a straight line and/or a curved line.

The transparent substrate may be transparent to the wavelength of the light in the used bandwidth, and be made of glass, quartz, or sapphire.

The reflective layer may be made of aluminum, or an aluminum alloy.

The dielectric layer may be made of Si oxide.

The absorption layer may contain Fe, or Ta, and further contain Si.

A surface of the polarizing plate on which light is incident may be covered with a protective film made of a dielectric material.

A surface of the polarizing plate on which light is incident may be covered with an organic water-repellent film.

Another aspect of the present invention is a method of manufacturing a polarizing plate having a wire grid structure, including: a reflective layer forming step of forming a reflective layer on one surface of a transparent substrate; a dielectric layer forming step of forming a dielectric layer on one surface of the reflective layer farther from the transparent substrate; an absorption layer forming step of forming an absorption layer on one surface of the dielectric layer farther from the reflective layer; and an etching step of forming grid-like projection portions arranged on the transparent substrate at a pitch shorter than a wavelength of light in a used bandwidth, by selectively etching a formed laminate, the etching step combining isotropic etching and anisotropic etching to form at least one step on a side wall of the reflective layer, the reflective layer having the largest width on the transparent substrate side.

Another aspect of the present invention is an optical device provided with the polarizing plate.

Effects of the Invention

The present invention can provide a polarizing plate having excellent selective absorptivity, and a manufacturing method thereof, and an optical device provided with the polarizing plate. More specifically, a polarizing plate with reflection in the absorption axis direction being suppressed, and a manufacturing method thereof, and an optical device provided with the polarizing plate, can be provided. Consequently, the present invention can provide a polarizing plate having high transmittance characteristics, and a low reflectance, a manufacturing method thereof, and an optical device provided with the polarizing plate. Furthermore, the present invention can form a polarizing plate that has a grid and is widest at the bottom. Accordingly, the mechanical strength of the polarizing plate can be improved. Furthermore, by adjusting the number of steps and shape of the reflective layer, the optical characteristics can be controlled. Consequently, for example, a polarizing plate optimal for required wavelengths can be fabricated, thereby improving the design flexibility.

BRIEF DESCRIPTION OF THE DRAWINGS

FIG. 12 is a graph showing the relationship between step angles and absorption-axis reflectances (Rs), at wavelengths ranging from 520 to 590 nm, of polarizing plates according to Examples 1 to 5, and Comparative Example 1.

PREFERRED MODE FOR CARRYING OUT THE INVENTION

Embodiments of the present invention are hereinafter described in detail with reference to the drawings.
[Polarizing Plate]
The polarizing plate of the present invention is a polarizing plate having a wire grid structure, the polarizing plate including: a transparent substrate; and grid-like projection portions that are arranged on the transparent substrate at a pitch (cycle) shorter than a wavelength of light in a used bandwidth, and extend in a predetermined direction. The grid-like projection portion portions each have at least a reflective layer, and a dielectric layer in order from the transparent substrate side. Note that the polarizing plate of the present invention may include a layer other than the transparent substrate, the reflective layer, and the dielectric layer, only if the advantageous effects of the present invention are exerted.

Figure 1:
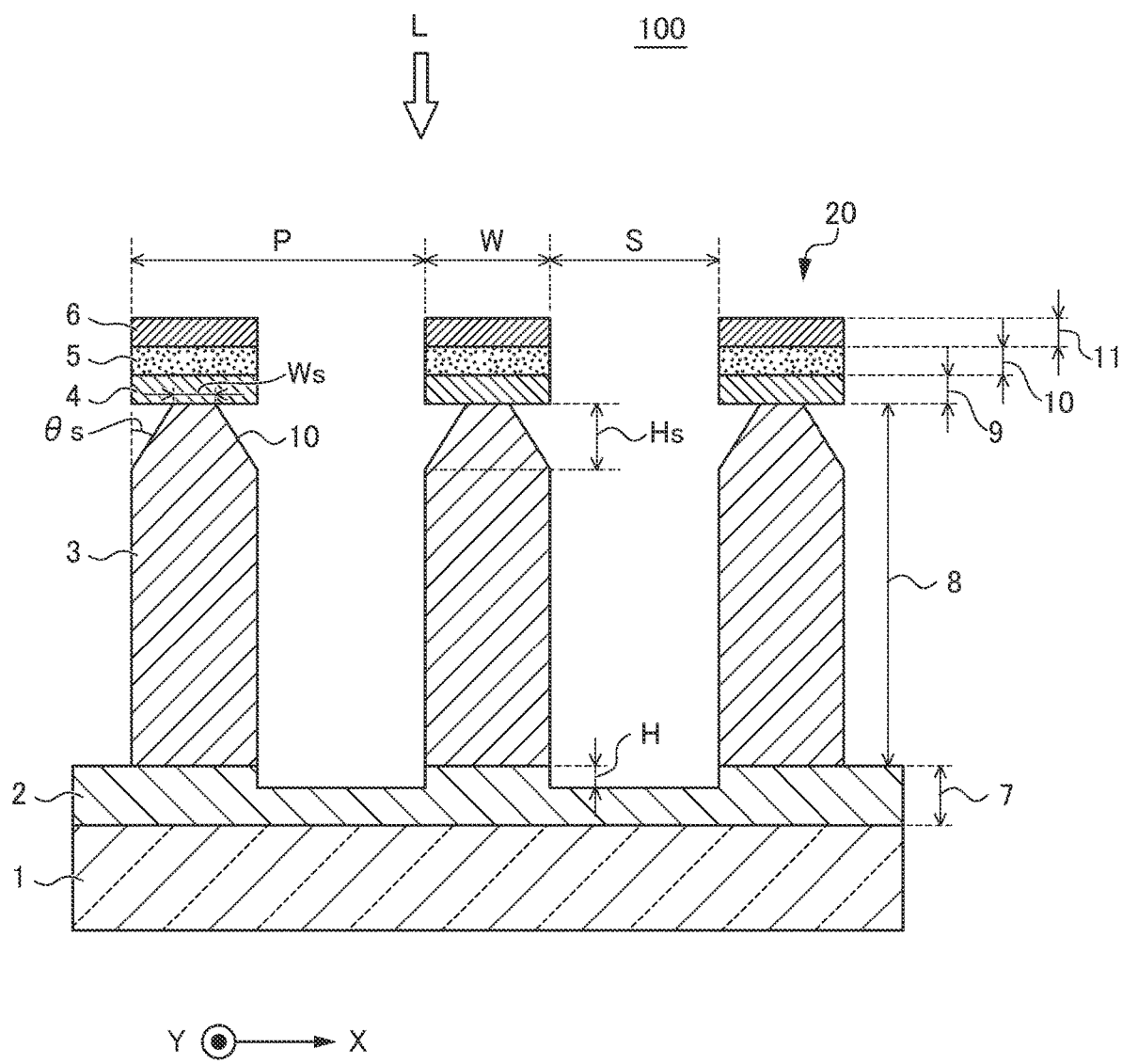
FIG. 1 is a schematic sectional view showing a polarizing plate according to one embodiment of the present invention.

FIG. 1 is a schematic sectional view showing a polarizing plate 100 according to one embodiment of the present invention. As shown in FIG. 1, the polarizing plate 100 includes: a transparent substrate 1 transparent to light in a used bandwidth; and grid-like projection portions 20 arranged on one surface of the transparent substrate 1 at a pitch shorter than the wavelength of the light in the used bandwidth. The grid-like projection portions 20 each include a second dielectric layer 2, a reflective layer 3, a dielectric layer 4, an absorption layer 5, and a third dielectric layer 6, in order from the transparent substrate 1 side. That is, the polarizing plate 100 has a wire grid structure where the grid-like projection portions 20 formed by laminating the reflective layer 3, and the dielectric layer 4 in this order from the transparent substrate 1 side are arranged in a one-dimensional grid on the transparent substrate 1.

Here, as shown in FIG. 1, a direction (predetermined direction) in which the grid-like projection portions 20 extend is called a Y-axis direction. A direction which is orthogonal to the Y-axis direction and in which the grid-like projection portions 20 are arranged along the principal surface of the transparent substrate 1, is called an X-axis direction. In this case, the light incident on the polarizing plate 100 enters one side of the transparent substrate X above which the grid-like projection portions 20 are formed. Preferably, the light enters in the direction orthogonal to the X-axis direction and the Y-axis direction.

The polarizing plate having the wire grid structure uses four actions including transmission, reflection, interference, and selective optical absorption of polarized waves due to optical anisotropy, thereby attenuating the polarized waves (TE waves (S-waves)) having electric field components parallel to the Y-axis direction, while transmitting the polarizing waves (TM waves (P-waves)) having electric field components parallel to the X-axis direction. Consequently, in FIG. 1, the Y-axis direction is the direction of the absorption axis of the polarizing plate. The X-axis direction is the transmission axis of the polarizing plate.

A part of the light L entering the polarizing plate 100, shown in FIG. 1, from a position where the grid-like projection portions 20 are formed, is absorbed while passing through the absorption layer 5 and the dielectric layer 4, and is attenuated. In the light having transmitted through the absorption layer 5, and the dielectric layer 4, the polarized waves (TM waves (P-waves)) transmit through the reflective layer 3 at a high transmittance. Meanwhile, in the light having transmitted through the absorption layer 5, and the dielectric layer 4, the polarized waves (TE waves (S-waves)) are reflected by the reflective layer 3. A part of the TE waves reflected by the reflective layer 3 is absorbed while the waves pass through the absorption layer 5, and the dielectric layer 4, and another part thereof is reflected, and returned to the reflective layer 3. The TE waves reflected by the reflective layer 3 are interfered and attenuated while passing through the absorption layer 5, and the dielectric layer 4. As described above, the selective attenuation of the TE waves allows the polarizing plate 100 to achieve desired polarization characteristics.

The grid-like projection portions of the polarizing plate of the present invention each include the reflective layer 3, and the dielectric layer 4, when viewed in the direction in which each one-dimensional grid extends as shown in FIG. 1, that is, in a sectional view orthogonal to the predetermined direction.

Here, the dimensions in this Description are described with reference to FIG. 1. The height means the dimensions in the direction perpendicular to the principal surface of the transparent substrate 1 in FIG. 1. A width W means a dimension in the X-axis direction orthogonal to the height direction, when viewed in the Y-axis direction along the direction in which the grid-like projection portions 20 extend. When the polarizing plate 100 is viewed in the Y-axis direction along the direction in which the grid-like projection portions 20 extend, the repetitive interval of the grid-like projection portions 20 in the X-axis direction is called a pitch P.

In the polarizing plate of the present invention, the pitch P of the grid-like projection portions is not specifically limited only if being shorter than the wavelength of the light in the used bandwidth. In view of easiness and stability of fabrication, it is preferable that the pitch P of the grid-like projection portions be 100 to 200 nm, for example. The pitch P of the grid-like projection portions can be measured by observation through a scanning electron microscope or a transmission electron microscope. For example, pitches P may be measured at freely selected four positions using a scanning electron microscope or a transmission electron microscope, and an arithmetic mean value thereof can be adopted as the pitch P of the grid-like projection portions. This measurement method is hereinafter called an electron microscope method.

When viewed in the direction (predetermined direction: Y-axis direction) in which the grid-like projection portions extend, the polarizing plate of the present invention is characterized in that the reflective layer has at least one step on a side thereof, and the width of the bottom on the transparent substrate side is the largest. Accordingly, a polarizing plate that is excellent in controlling reflectance characteristics, and has excellent selective absorptivity, specifically, a polarizing plate with reflection in the absorption axis direction being suppressed, can be achieved.

Note that the step formed on the reflective layer means a shape having a width changing in a stepwise or continuous manner when the reflective layer is viewed in the direction (predetermined direction: Y-axis direction) in which the grid-like projection portions extend. Consequently, the step in the present invention is not limited to what is formed of a linear line, for example, a curved line or the like. The number of steps is not limited to one. A multi-step including two or more steps may be adopted.

The polarizing plate having the wire grid structure attenuates the polarized waves (TE waves (S-waves)) having electric field components parallel to the direction in which the grid-like projection portions extend (Y-axis direction), while transmitting the polarizing waves (TM waves (P-waves)) having electric field components parallel to the X-axis direction, as described above. That is, characteristics are required that neither transmit nor reflect the polarized waves (TE waves (S-waves)) having electric field components parallel to the direction in which the grid-like projection portions extend (Y-axis direction). Reduction in reflectance is important characteristics required.

Here, in the polarizing plate of the present invention, the step is formed on the reflective layer. Accordingly, the polarized waves (TE waves (S-waves)) that have electric field components parallel to the direction in which the grid-like projection portions extend (Y-axis direction), and perpendicularly enter the transparent substrate are reflected by the reflective layer, and subsequently, a part thereof is bent by the step, and is scattered. The scattered polarized waves (TE waves (S-waves)) having electric field components parallel to the direction in which the grid-like projection portions extend (Y-axis direction) do not contribute to reflection. As a result, the reflection in the absorption axis direction can be suppressed.

(Transparent Substrate)

The transparent substrate (transparent substrate 1 in FIG. 1) is not specifically limited only if it is a substrate exhibiting light transmittance to the light in the used bandwidth. The substrate may be appropriately selected in conformity with the purpose.

"Exhibiting light transmittance to the light in the used bandwidth" does not mean that the transmittance of the light in the used bandwidth is 100%. Instead, it is only required to exhibit light transmittance allowing the functions as those of the polarizing plate to be maintained. The light in the used bandwidth may be, for example, visible light having a wavelength of about 380 to 810 nm.

The principal surface shape of the transparent substrate is not specifically limited. A shape in conformity with the purpose (e.g., a rectangular shape) is appropriately selected. Preferably, the mean thickness of the transparent substrate is 0.3 to 1 mm.

Preferably, the constituent material of the transparent substrate is a material having a refractive index of 1.1 to 2.2. The material may be glass, quartz, sapphire or the like. In view of cost and light transmittance, it is preferable to adopt glass, specifically quartz glass (refractive index of 1.46), or soda-lime glass (refractive index of 1.51). The component composition of a glass material is not specifically limited. For example, inexpensive glass material, such as silicate glass, which is widely commercially available, may be used as optical glass.

In view of thermal conductivity, it is preferable to adopt quartz, or sapphire, which has a high thermal conductivity. Accordingly, a high light resistance to high-intensity light is achieved. It is preferable that the material be adopted as the polarizing plate for an optical engine of a projector, which has a large amount of heat generation.

Note that in a case of adopting a transparent substrate made of an optically active crystal, such as quartz, it is preferable to arrange the grid-like projection portions 20 in a direction parallel or perpendicular to the optical axis of the crystal. Accordingly, excellent optical characteristics can be achieved. Here, the optical axis is a directional axis minimizing the difference between refractive indices of O (normal rays) and E (abnormal rays) of light traveling in the direction.

(Second Dielectric Layer)

The second dielectric layer (the second dielectric layer 2 in FIG. 1) is any layer in the present invention. The layer is formed on the transparent substrate, and is thus formed between the reflective layer and the transparent substrate in the present invention.

The second dielectric layer 2 in the polarizing plate 100 according to one embodiment of the present invention shown in FIG. 1 is laminated on the transparent substrate 1. A portion of an engraved amount H engraved by etching forms a part of the grid-like projection portions 20.

The material constituting the second dielectric layer may be identical to or different from that of a dielectric layer described later. The material may be, for example, a common material that is Si oxide such as $SiO_2$, metal oxide such as $Al_2O_3$, beryllium oxide, or bismuth oxide, $MgF_2$, cryolite, germanium, titanium dioxide, silicon, magnesium fluoride, boron nitride, boron oxide, tantalum oxide, carbon, or a combination thereof. It is preferable that among them, the second dielectric layer be made of Si oxide.

Preferably, the refractive index of the second dielectric layer is higher than 1.0, and equal to or lower than 2.5. The optical characteristics of the reflective layer is affected also by the refractive indices therearound. Accordingly, selection of the material of the dielectric layer can control the polarizing plate characteristics.

The film thickness of the second dielectric layer is not specifically limited. Preferably, the thickness is, for example, 10 to 100 nm. Note that the film thickness of the second dielectric layer can be measured by the electron microscope method described above, for example.

(Reflective Layer)

The reflective layer (reflective layer 3 in FIG. 1) is formed on one surface of the transparent substrate, and is arrangement of a metal film extending in a belt-like manner in the Y-axis direction that is the absorption axis. Note that in the present invention, for example, as with the polarizing plate 100 shown in FIG. 1 described above, another layer other than the second dielectric layer or the like may be present between the transparent substrate and the reflective layer.

The reflective layer contributes to exerting the functions as those of the wire-grid polarizer, attenuates the polarized waves (TE waves (S-waves)) having electric field components in a direction parallel to the direction (longitudinal direction) in which the reflective layer extends, and transmits the polarizing waves (TM waves (P-waves)) having electric field components in a direction orthogonal to the direction (longitudinal direction) in which the reflective layer extends.

The reflective layer of the polarizing plate of the present invention extends substantially perpendicularly to the direction of the surface of the transparent substrate. When viewed in the direction (predetermined direction: Y-axis direction) in which the grid-like projection portions extend, that is, in a sectional view orthogonal to the predetermined direction, the reflective layer is characterized in that the reflective layer has at least one step on a side thereof, and the width of the bottom on the transparent substrate side is the largest. Accordingly, the present invention can achieve the polarizing plate excellent in controlling the reflectance characteristics, and can obtain the polarizing plate that has excellent selective absorptivity, specifically, the polarizing plate with reflection in the absorption axis direction being suppressed.

The constituent material of the reflective layer is not specifically limited only if the material has reflectivity to the light in the used bandwidth. The material may be, for example, an elementary simple substance, such as Al, Ag, Cu, Mo, Cr, Ti, Ni, W, Fe, Si, Ge, or Te, or an alloy containing one or more of them. Preferably, the reflective layer is made of aluminum, or an aluminum alloy, among them. Note that besides these metal materials, for example, an inorganic film, or a resin film that is not metal and is formed to have a high surface reflectance due to coloring or the like may constitute the reflective layer.

The film thickness (8 in FIG. 1) of the reflective layer is not specifically limited. Preferably, the thickness is, for example, 100 to 300 nm. Note that the film thickness of the reflective layer can be measured by the electron microscope method described above, for example.

Preferably, the bottom of the reflective layer, which is on the transparent substrate side, and has the largest width among the widths of the reflective layer of the polarizing plate of the present invention, has a ratio to the pitch P ranging from 20% to 50%, for example, according to a certain relationship between the grid-like projection portions and the pitch P. Note that these widths can be measured by the electron microscope method described above, for example.

When viewed in the direction (predetermined direction: Y-axis direction) in which the grid-like projection portions 20 extend, that is, in a sectional view orthogonal to the predetermined direction, the reflective layer 3 of the polarizing plate 100 according to one embodiment of the present invention shown in FIG. 1 has at least one step 10 on each of opposite sides, and the width of the bottom on the transparent substrate 1 side is the largest. In further detail, in a sectional view orthogonal to the predetermined direction, the reflective layer 3 of the polarizing plate 100 has a shape where a substantial isosceles trapezoid is combined on a substantial rectangle, the shape having a tapered shape where the length of the lower base of the trapezoid portion is equal to the width of the rectangle portion, and the sides are inclined such that the nearer to the upper base of the trapezoid portion (farther from the transparent substrate 1), the narrower the width becomes.

In the polarizing plate 100 according to one embodiment of the present invention shown in FIG. 1, the step angle of the reflective layer 3 represented by θs can be in a range of 0°<θs<90°. Preferably, in this range, the angle is in a range of 15°<θs<90°.

A method of providing at least one step on a side of the reflective layer, and increasing the width of the bottom on the transparent substrate side to the maximum, may be, for example, a method of changing the balance using isotropic etching and anisotropic etching in a combined manner.

(Dielectric Layer)

The dielectric layer (dielectric layer 4 in FIG. 1) is formed on the reflective layer, and is arrangement of a dielectric film extending in a belt-like manner in the Y-axis direction that is the absorption axis. Note that in the present invention, another layer may be present between the reflective layer and the dielectric layer.

The film thickness (9 in FIG. 1) of the dielectric layer is formed in a range where the phase of polarization that has transmitted through the absorption layer, and been reflected by the reflective layer deviates by half a wavelength from polarization reflected by the absorption layer. Specifically, the film thickness of the dielectric layer is appropriately configured in a range from 1 to 500 nm capable of improving the interference effect by adjusting the phase of polarization. The film thickness of the dielectric layer can be measured by the electron microscope method described above, for example.

The material constituting the dielectric layer may be, for example, a common material that is Si oxide such as $SiO_2$, metal oxide such as $Al_2O_3$, beryllium oxide, or bismuth oxide, $MgF_2$, cryolite, germanium, titanium dioxide, silicon, magnesium fluoride, boron nitride, boron oxide, tantalum oxide, carbon, or a combination thereof. It is preferable that among them, the dielectric layer 4 be made of Si oxide.

Preferably, the refractive index of the dielectric layer is higher than 1.0, and equal to or lower than 2.5. The optical characteristics of the reflective layer is affected also by the refractive indices therearound. Accordingly, selection of the material of the dielectric layer can control the polarization characteristics.

The TE waves reflected by the reflective layer by appropriately adjusting the film thickness, and refractive index of the dielectric layer, can be partially reflected, and returned to the reflective layer, while passing through the absorption layer, and the light having passed through the absorption layer can be attenuated by interference. As described above, the selective attenuation of the TE waves can achieve desired polarization characteristics.

In the polarizing plate of the present invention, the width of the dielectric layer is not specifically limited. There is no problem in that the width is larger or smaller than the width of the reflective layer positioned as a lower layer. Preferably, the width of the dielectric layer may have a ratio to the pitch P ranging from 20% to 50%, for example, according to a certain relationship with the pitch P of the grid-like projection portions. Note that these widths can be measured by the electron microscope method described above, for example.

The dielectric layer 4 of the polarizing plate 100 according to one embodiment of the present invention shown in FIG. 1 is laminated on the reflective layer 3 perpendicularly to the direction of the surface of the transparent substrate 1. When viewed in the direction (predetermined direction: Y-axis direction) in which the grid-like projection portions extend, that is, in a sectional view orthogonal to the predetermined direction, the dielectric layer 4 has a rectangular shape. The width of the dielectric layer 4 is substantially identical to the width of the rectangle portion of the reflective layer 3 positioned as the lower layer.

(Absorption Layer)

The absorption layer (absorption layer 5 in FIG. 1) is formed on the dielectric layer, and is arranged to extend in a belt-like manner in the Y-axis direction that is the absorption axis. The absorption layer forms a part of the grid-like projection portions 20.

The constituent material of the absorption layer may be one or more of materials in which the extinction constant as an optical constant of a metal material, a semiconductor material or the like is not zero and which has an optical absorption effect, and is appropriately selected according to the wavelength range of light to be applied. The metal material may be an elementary simple substance, such as Ta, Al, Ag, Cu, Au, Mo, Cr, Ti, W, Ni, Fe, or Sn, or an alloy containing one or more of them. The semiconductor material may be Si, Ge, Te, ZnO, a silicide material ($\beta$-FeSi$_2$, MgSi$_2$, NiSi$_2$, BaSi$_2$, CrSi$_2$, CoSi$_2$, TaSi, etc.). Adoption of such materials allows the polarizing plate 100 to achieve a high extinction ratio in a visible light range to be applied. Preferably, the absorption layer contains Fe, or Ta, and further contains Si, among them.

In a case of adopting a semiconductor material as the absorption layer, the bandgap energy of the semiconductor affects the absorption effect. Accordingly, the bandgap energy is required to be equal to or lower than the used bandwidth. For example, in a case of use with visible light, absorption at the wavelength of 400 nm or higher is required, that is, a material having a bandgap of 3.1 eV or lower is required to be adopted.

The film thickness (10 in FIG. 1) of the absorption layer is not specifically limited. Preferably, the thickness is, for example, 10 to 100 nm. The film thickness of the absorption layer 5 can be measured by the electron microscope method described above, for example.

Note that the absorption layer can be formed as a high-density film by the evaporation method or the sputtering method. The absorption layer may include two or more layers made of different constituent materials.

Preferably, the width of the absorption layer may have a ratio to the pitch P ranging from 20% to 50%, for example, according to a certain relationship with the pitch P of the grid-like projection portions. Note that these widths can be measured by the electron microscope method described above, for example.

The absorption layer 5 of the polarizing plate 100 according to one embodiment of the present invention shown in FIG. 1 is laminated on the reflective layer 4 perpendicularly to the direction of the surface of the transparent substrate 1. When viewed in the direction (predetermined direction: Y-axis direction) in which the grid-like projection portions extend, that is, in a sectional view orthogonal to the predetermined direction, the dielectric layer 4 has a rectangular shape. The width of the absorption layer 5 is substantially identical to the width of the rectangle portion of the reflective layer 3 positioned as the lower layer, and the width of the dielectric layer 6.

(Third Dielectric Layer)

The third dielectric layer (the dielectric layer 2 in FIG. 1) is any layer in the present invention. The dielectric layer is formed on the transparent substrate, is different from the dielectric layer in the present invention, and is formed as an upper layer thereof.

The third dielectric layer 6 in the polarizing plate 100 according to one embodiment of the present invention shown in FIG. 1 is laminated on the absorption layer 5, and forms a part of the grid-like projection portions 20.

The material constituting the third dielectric layer may be identical to or different from that of the dielectric layer described above, and to that of the second dielectric layer if it is present. The material may be, for example, a common material that is Si oxide such as SiO$_2$, metal oxide such as Al$_2$O$_3$, beryllium oxide, or bismuth oxide, MgF$_2$, cryolite, germanium, titanium dioxide, silicon, magnesium fluoride, boron nitride, boron oxide, tantalum oxide, carbon, or a combination thereof. It is preferable that among them, the second dielectric layer be made of Si oxide.

Preferably, the refractive index of the third dielectric layer is higher than 1.0, and equal to or lower than 2.5. The optical characteristics of the reflective layer is affected also by the refractive indices therearound. Accordingly, selection of the material of the dielectric layer can control the polarizing plate characteristics.

The film thickness (11 in FIG. 1) of the third dielectric layer is not specifically limited. Preferably, the thickness is, for example, 10 to 100 nm. Note that the film thickness of the third dielectric layer can be measured by the electron microscope method described above, for example.

(Diffusion Barrier Layer)

The polarizing plate of the present invention may include a diffusion barrier layer between the dielectric layer and the absorption layer. Inclusion of the diffusion barrier layer can prevent light in the absorption layer from being diffused. The diffusion barrier layer may be made of a metal film, such as Ta, W, Nb, or Ti.

(Protective Film)

The surface of the polarizing plate of the present invention on which light is incident may be covered with a protective film made of a dielectric material, within a range that does not affect change in optical characteristics. The protective film is made up of a dielectric film, and can be formed using CVD (Chemical Vapor Deposition) or ALD (Atomic Layer Deposition), on the surface (on which the wire grid is formed) of the polarizing plate, for example. Accordingly, an oxidation reaction beyond necessity to the metal film can be suppressed.

(Organic Water-Repellent Film)

Furthermore, the surface of the polarizing plate of the present invention on which light is incident may be covered with an organic water-repellent film. The organic water-repellent film is made of, for example, fluorinated silane compound, such as perfluorodecyltriethoxysilane (FDTS), and can be formed using CVD or ALD described above, for example. Accordingly, the reliability of the moisture resistance or the like of the polarizing plate can be improved.

Note that the present invention is not limited to the aforementioned embodiment shown in FIG. 1. Modification and improvement within a range of achieving the object of the present invention is encompassed by the present invention.

Figure 3:
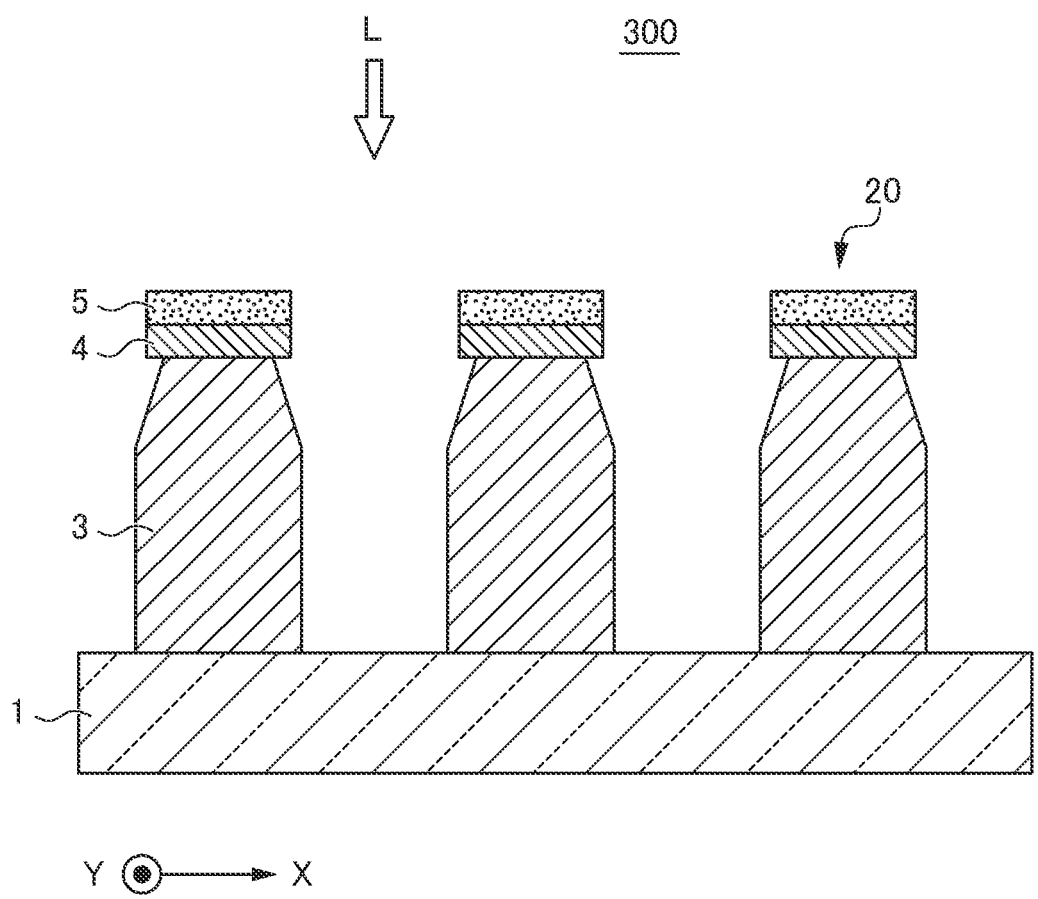
FIG. 3 is a schematic sectional view showing a polarizing plate according to one embodiment of the present invention.

FIG. 3 is a schematic sectional view showing a polarizing plate 300 according to one of embodiments of the present invention. The polarizing plate 300 shown in FIG. 3 includes grid-like projection portions 20 on a transparent substrate 1. As for the grid-like projection portions 20, a reflective layer 3 is directly formed on the transparent substrate 1, a dielectric layer 4 is formed on the reflective layer 3, and an absorption layer 5 is formed thereon. That is, the polarizing plate 300 shown in FIG. 3 is a polarizing plate that does not include the second dielectric layer 2, and the third dielectric layer 6, which are present in the polarizing plate 100 shown in FIG. 1.

Similar to FIG. 1, according to the embodiment shown in FIG. 3, when viewed in the direction (predetermined direction: Y-axis direction) in which the grid-like projection portions extend, that is, in a sectional view orthogonal to the predetermined direction, one step on each of opposite sides is included, and the width of the bottom on the transparent substrate 1 side is the largest. In further detail, in a sectional view orthogonal to the predetermined direction, the reflective layer 3 of the polarizing plate 300 has a shape where a substantial isosceles trapezoid is combined on a substantial rectangle, the shape having a tapered shape where the length of the lower base of the trapezoid portion is equal to the width of the rectangle portion, and the sides are inclined such that the nearer to the upper base of the trapezoid portion (farther from the transparent substrate 1), the narrower the width becomes.

Figure 4:
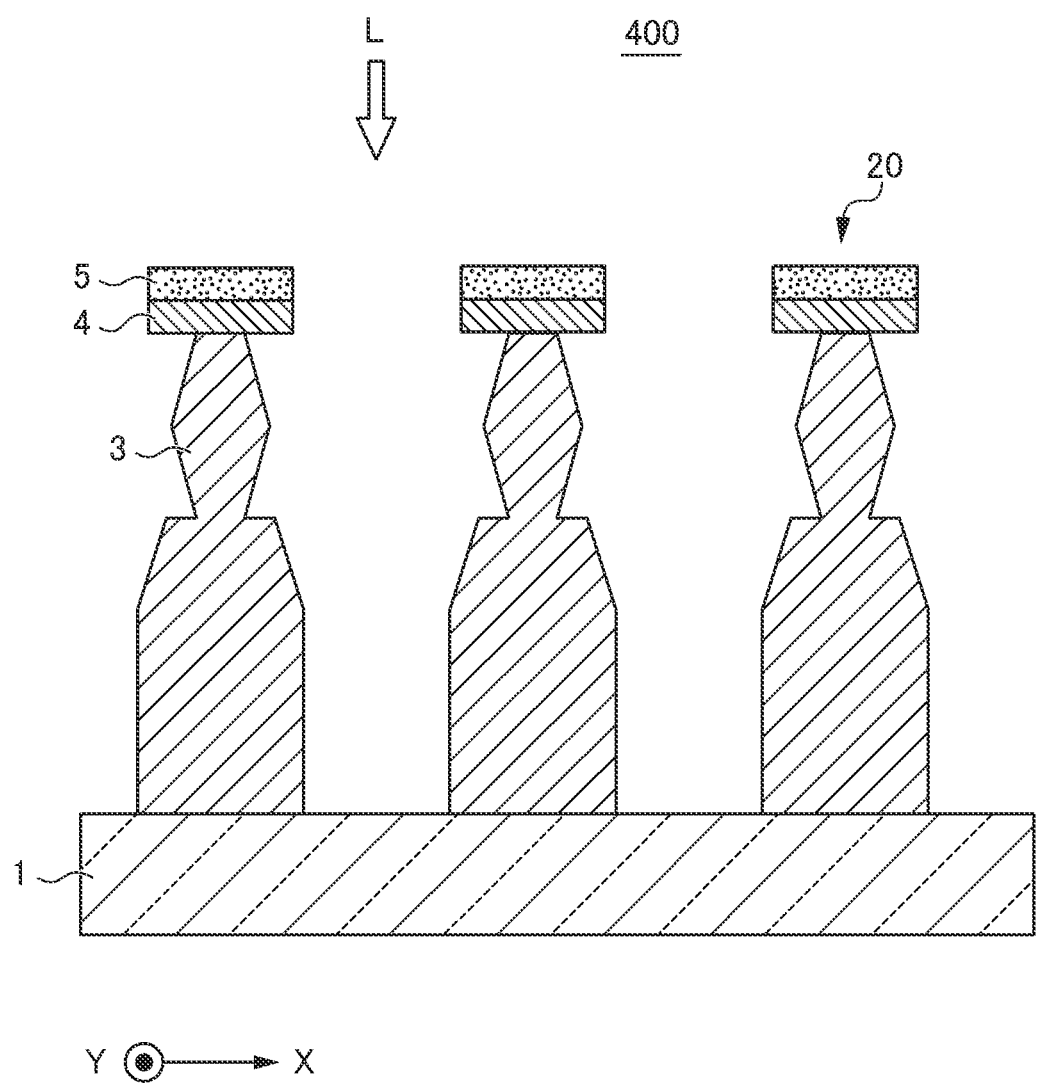
FIG. 4 is a schematic sectional view showing a polarizing plate according to one embodiment of the present invention.

FIG. 4 is a schematic sectional view showing a polarizing plate 400 according to another embodiment of the present invention. In the polarizing plate 400 shown in FIG. 4, as for the grid-like projection portions 20, a reflective layer 3 is directly formed on the transparent substrate 1, a dielectric layer 4 is formed on the reflective layer 3, and an absorption layer 5 is formed thereon.

According to the embodiment shown in FIG. 4, when viewed in the direction (predetermined direction: Y-axis direction) in which the grid-like projection portions extend, that is, in a sectional view orthogonal to the predetermined direction, four steps on opposite sides are included, and the width of the bottom on the transparent substrate 1 side is the largest.

Figure 5:
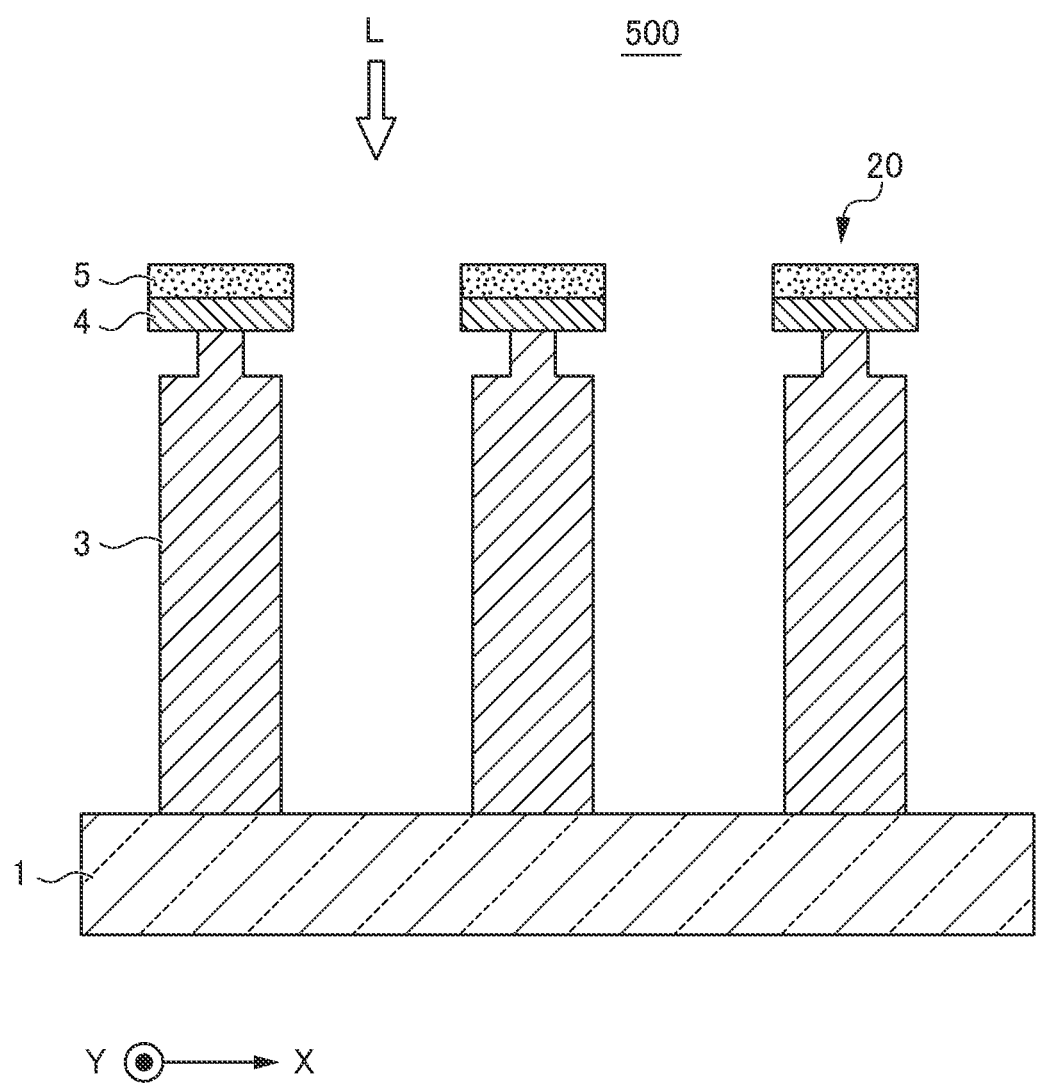
FIG. 5 is a schematic sectional view showing a polarizing plate according to one embodiment of the present invention.

FIG. 5 is a schematic sectional view showing a polarizing plate 500 according to still another embodiment of the present invention. In the polarizing plate 500 shown in FIG. 5, as for the grid-like projection portions 20, a reflective layer 3 is directly formed on the transparent substrate 1, a dielectric layer 4 is formed on the reflective layer 3, and an absorption layer 5 is formed thereon.

According to the embodiment shown in FIG. 5, when viewed in the direction (predetermined direction: Y-axis direction) in which the grid-like projection portions extend, that is, in a sectional view orthogonal to the predetermined direction, two steps having a substantially right angle on opposite sides are included, and the width of the bottom on the transparent substrate 1 side is the largest.

Figure 6:
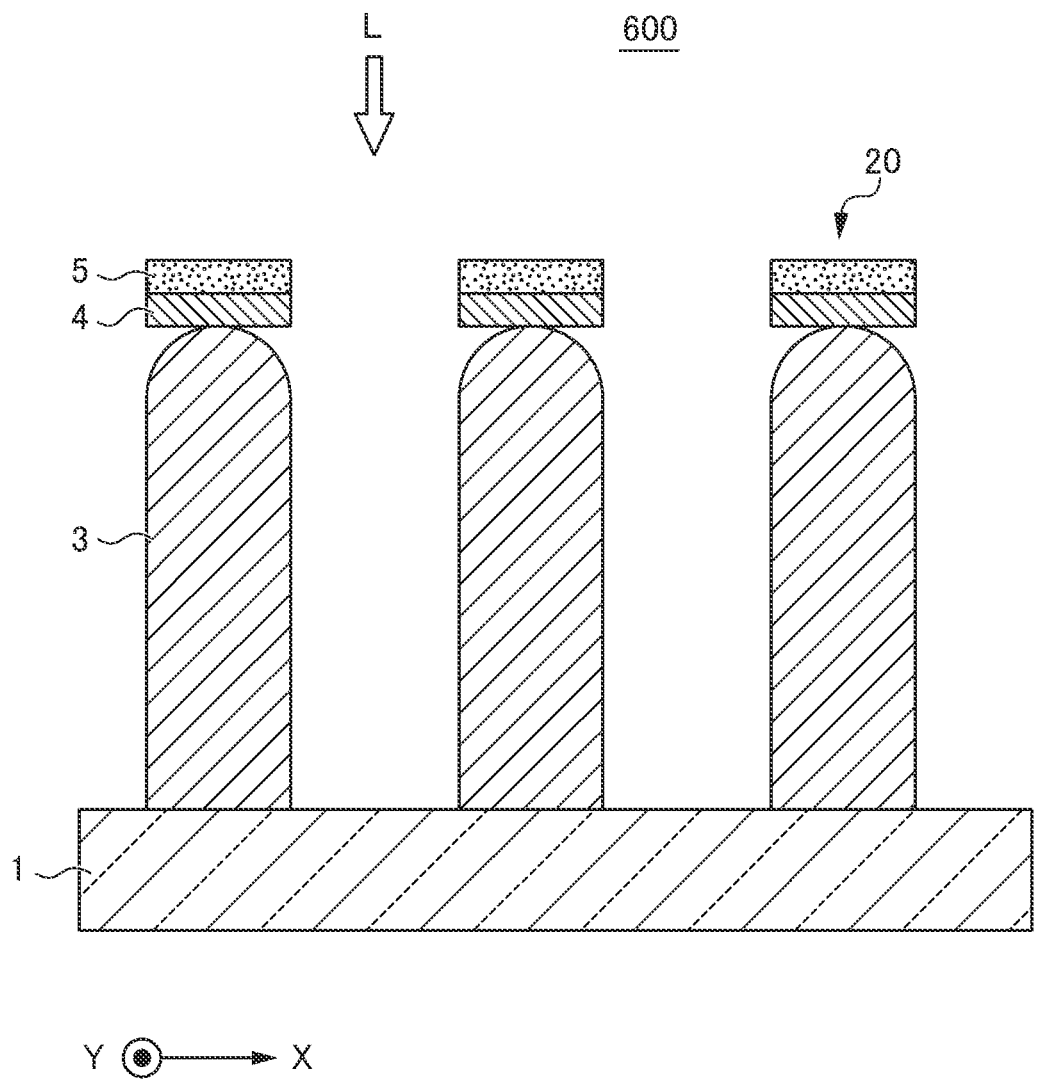
FIG. 6 is a schematic sectional view showing a polarizing plate according to one embodiment of the present invention.

FIG. 6 is a schematic sectional view showing a polarizing plate 600 according to still another embodiment of the present invention. In the polarizing plate 600 shown in FIG. 6, as for the grid-like projection portions 20, a reflective layer 3 is directly formed on the transparent substrate 1, a dielectric layer 4 is formed on the reflective layer 3, and an absorption layer 5 is formed thereon.

According to the embodiment shown in FIG. 6, when viewed in the direction (predetermined direction: Y-axis direction) in which the grid-like projection portions 20 extend, that is, in a sectional view orthogonal to the predetermined direction, one step formed of a curved line is included on each of opposite sides, and the width of the bottom on the transparent substrate 1 side is the largest. An area formed of the curved line has a tapered shape which becomes smaller and of which the width becomes narrower, as approaching the dielectric layer 4 (farther from the transparent substrate 1).

[Manufacturing Method of Polarizing Plate]

A method of manufacturing a polarizing plate according to the present invention includes a reflective layer forming step, a dielectric layer forming step, an absorption layer forming step, and an etching step.

The reflective layer forming step forms a reflective layer on one surface of a transparent substrate. The dielectric layer forming step forms a dielectric layer on the reflective layer formed in the reflective layer forming step. The absorption layer forming step forms an absorption layer on the dielectric layer formed in the dielectric layer forming step. These layer forming steps can form the respective layers by the sputtering method or the evaporation method, for example.

The etching step forms grid-like projection portions arranged on the transparent substrate at a pitch shorter than the wavelength of light in a used bandwidth, by selectively etching a formed laminate formed through each layer forming step described above. Specifically, a one-dimensional grid mask pattern is formed by a photolithography method, or a nanoimprint method, for example. Grid-like projection portions arranged on the transparent substrate at a pitch shorter than the wavelength of light in the used bandwidth are formed by selectively etching the formed laminate. The etching method may include, for example, a dry etching method using etching gas supporting an etching target.

In particular, according to the present invention, by combining isotropic etching and anisotropic etching to change the balance, at least one step is formed on a side wall of the reflective layer, the reflective layer having the largest width on the transparent substrate side.

Note that the method of manufacturing the polarizing plate of the present invention may include a step of covering the surface thereof with a protective film made of a dielectric material. The method of manufacturing the polarizing plate of the present invention may include a step of covering the surface thereof with an organic water-repellent film.

[Optical Device]

An optical device according to the present invention includes the aforementioned polarizing plate according to the present invention. The optical device may be a liquid crystal projector, a head-up display, a digital camera or the like. The polarizing plate according to the present invention can be used for various use applications, as a polarizing plate having a high transmitting power of polarization in the transmission axis. The plate is an inorganic polarizing plate excellent in heat resistance in comparison with an organic polarizing plate made of an organic material. Consequently, the polarizing plate is particularly suitable for use applications, such as a liquid crystal projector, or a head-up display, which requires heat resistance.

In a case where the optical device according to the present invention includes multiple polarizing plates, only at least one of the polarizing plates is required to be a polarizing plate according to the present invention. For example, in the case where the optical device according to this embodiment is a liquid crystal projector, at least one of polarizing plates disposed on an incident side and an output side of the liquid crystal panel is required to be a polarizing plate according to the present invention.

The polarizing plate, the manufacturing method thereof, and the optical device according to the present invention, which have been described above, exert the following advantageous effects.

The polarizing plate according to the present invention is a polarizing plate having excellent selective absorptivity, and specifically, is a polarizing plate with reflection in the absorption axis direction being suppressed. Consequently, the present invention can provide a polarizing plate having high transmittance characteristics, and a low reflectance, a manufacturing method thereof, and an optical device provided with the polarizing plate. Furthermore, the present invention can form a polarizing plate that has a grid and is widest at the bottom. Accordingly, the mechanical strength of the polarizing plate can be improved. Furthermore, by adjusting the number of steps and shape of the reflective layer, the optical characteristics can be controlled. Consequently, a polarizing plate that is excellent in controlling the reflectance characteristics, and is, for example, optimal for required wavelengths can be fabricated, thereby improving the design flexibility.

EXAMPLES

Next, Examples of the present invention are described. However, the present invention is not limited to these Examples.

Examples 1 to 5 and Comparative Example 1

[Fabrication of Polarizing Plate]

Figure 2:
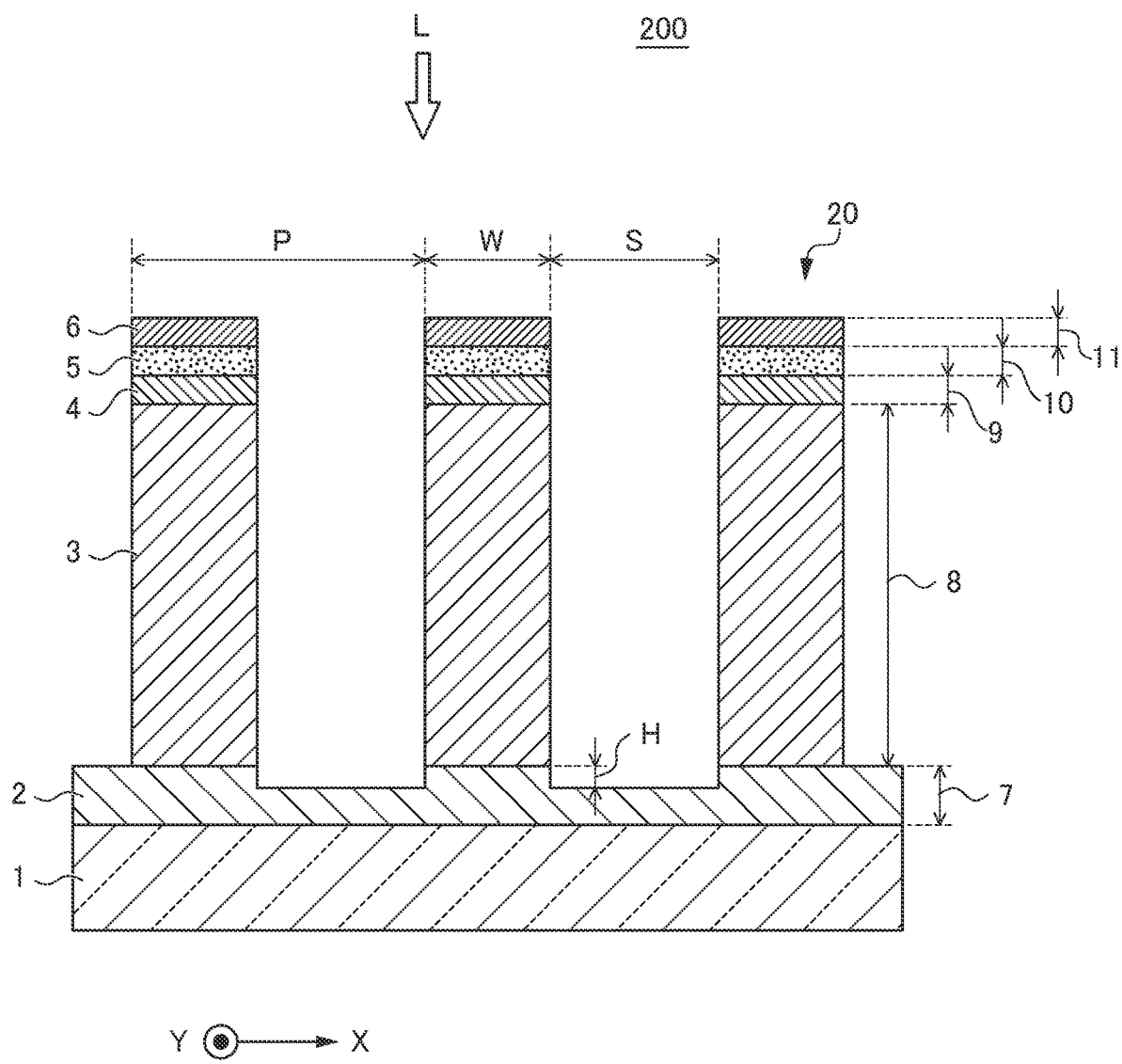
FIG. 2 is a schematic sectional view showing a polarizing plate according to one embodiment having a conventional structure.

In Examples 1 to 5, simulation is performed for polarizing plates 100 which have the structure shown in FIG. 1 and in which the step angle θs of the reflective layer 3 is 87°, 45°, 21°, 8°, and 4°. In Comparative Example 1, a polarizing plate 200 different from the polarizing plate 100 of Example 1 only in the structure of the reflective layer 3 is fabricated, and is provided for simulation. The polarizing plate 200 serving as Comparative Example 1 has a structure shown in FIG. 2. When viewed in the direction (predetermined direction: Y-axis direction) in which the grid-like projection portions 20 extend, that is, in a sectional view orthogonal to the predetermined direction, the shape of the reflective layer 3 is rectangular, and includes no step (step angle θs=0°).

The step angle θs in the polarizing plate 100 is obtained by the following Expression 1.

$$\theta s = \arctan\{Hs/(W-Ws)/2\}$$ [Expression 1]

Here, as shown in FIG. 1, Hs denotes the height of the step 10, W denotes the width of the grid-like projection portion 20, and Ws denotes the top width of the reflective layer 3.

Figure 7:
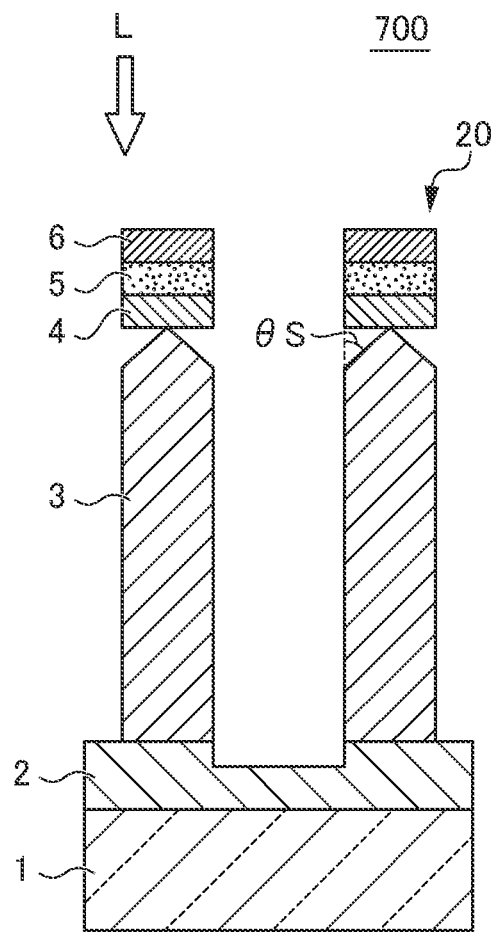
FIG. 7 is a schematic sectional view showing a polarizing plate having a step angle of 87°.
Figure 8:
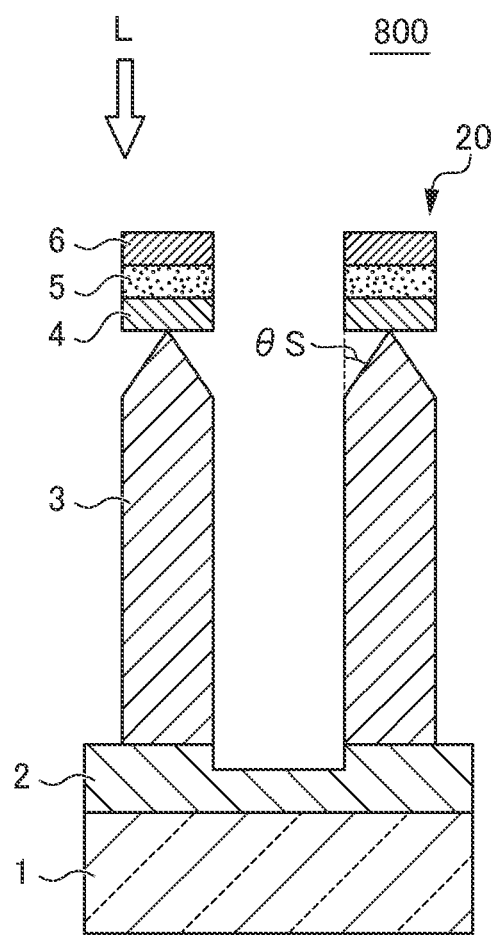
FIG. 8 is a schematic sectional view showing a polarizing plate having a step angle of 45°.
Figure 9:
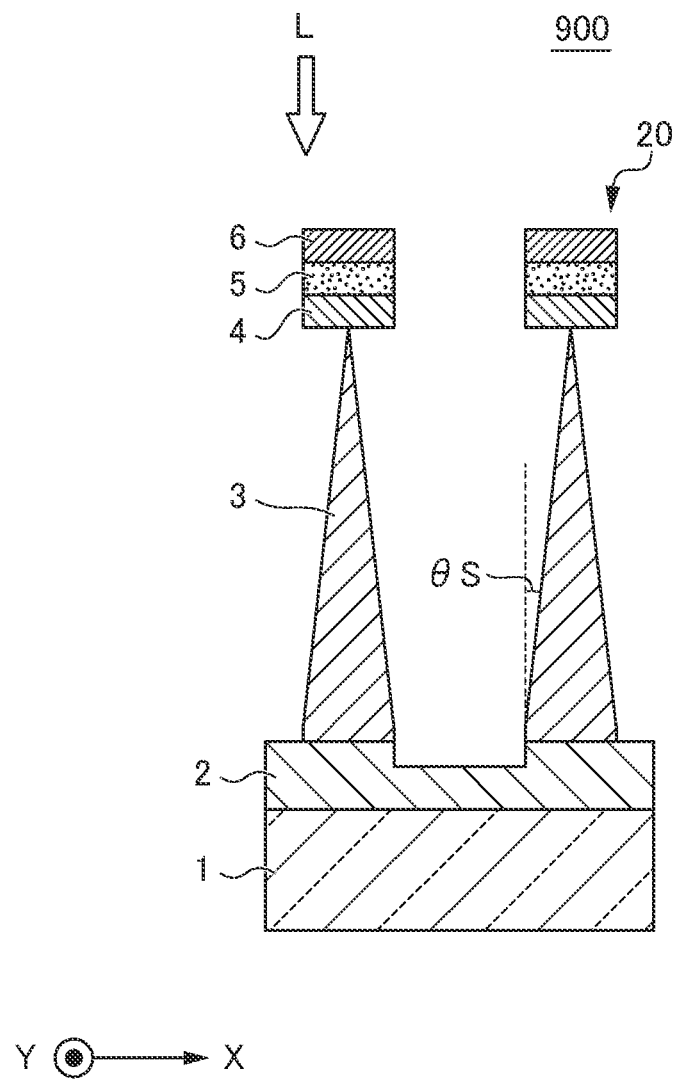
FIG. 9 is a schematic sectional view showing a polarizing plate having a step angle of 4°.

FIG. 7 shows a schematic sectional view of a polarizing plate 700 in which the step angle θs of the reflective layer 3 is 87° and which serves as Example 1. FIG. 8 shows a schematic sectional view of a polarizing plate 800 in which the step angle θs of the reflective layer 3 is 45° and which serves as Example 2. FIG. 9 shows a schematic sectional view of a polarizing plate 900 in which the step angle θs of the reflective layer 3 is 4° and which serves as Example 5.

[Simulation Method]

The optical characteristics of the polarizing plates of Examples 1 to 3 and Comparative Example 1 are verified by electromagnetic field simulation by the RCWA (Rigorous Coupled Wave Analysis) method. Grating simulator Gsolver v5.1 by Grating Solver Development Company is used for the simulation.

For verification of the relationship between the wavelength and the absorption-axis transmittance, the transmittance when polarized waves (TE waves (S-waves)) having electric field components in the direction parallel to the direction (longitudinal direction) in which the grid-like projection portions extend are incident is verified. For verification of the relationship between the wavelength and the absorption-axis reflectance, the reflectance when polarized waves (TE waves (S-waves)) having electric field components in the direction parallel to the direction (longitudinal direction) in which the grid-like projection portions extend are incident at an incident angle of 5° is verified.

[Simulation Results]

Figure 10:
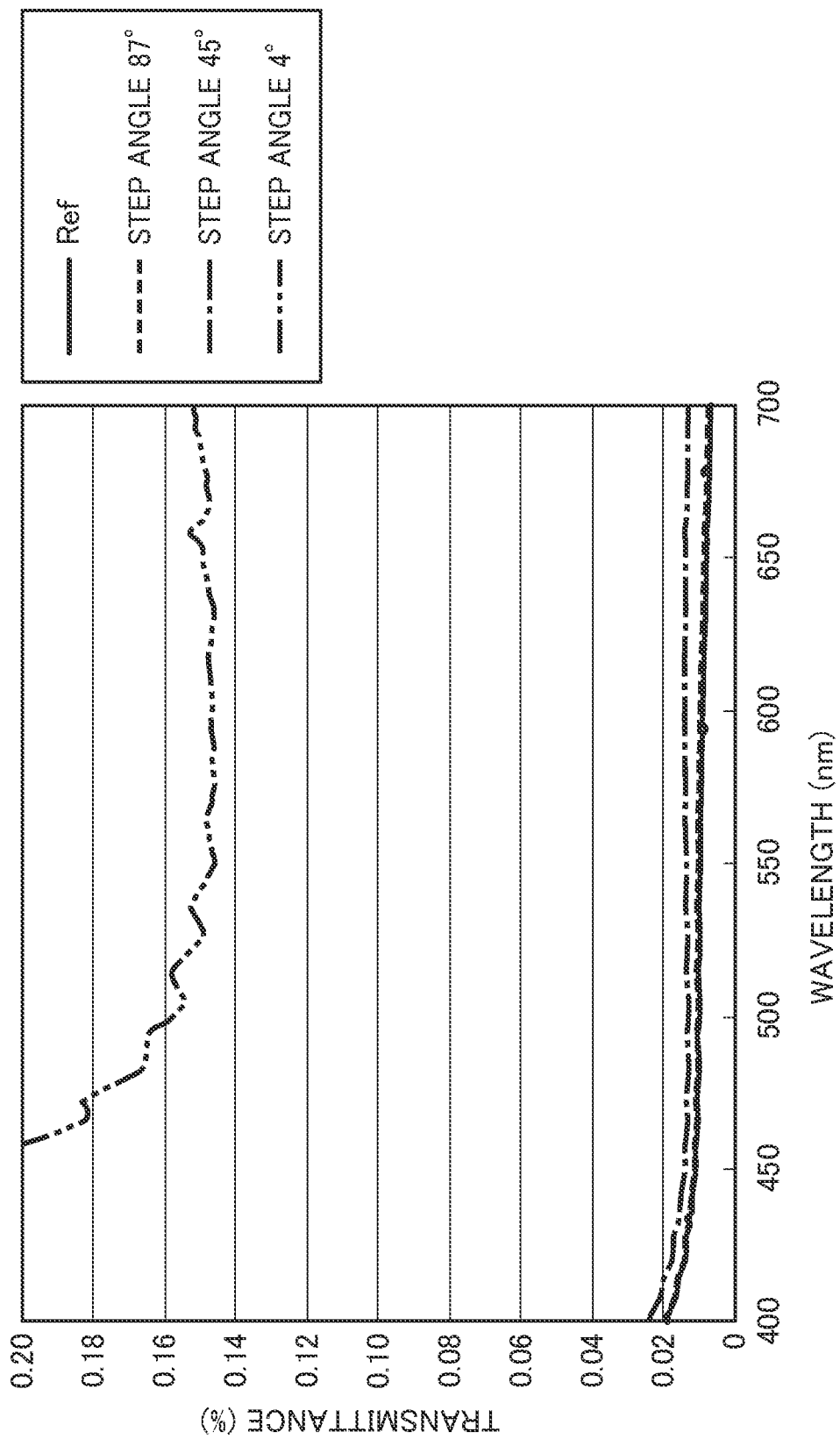
FIG. 10 is a graph showing results of verifying the relationships between wavelengths and absorption-axis transmittances of polarizing plates according to Examples 1, 2 and 5, and Comparative Example 1.
Figure 11:
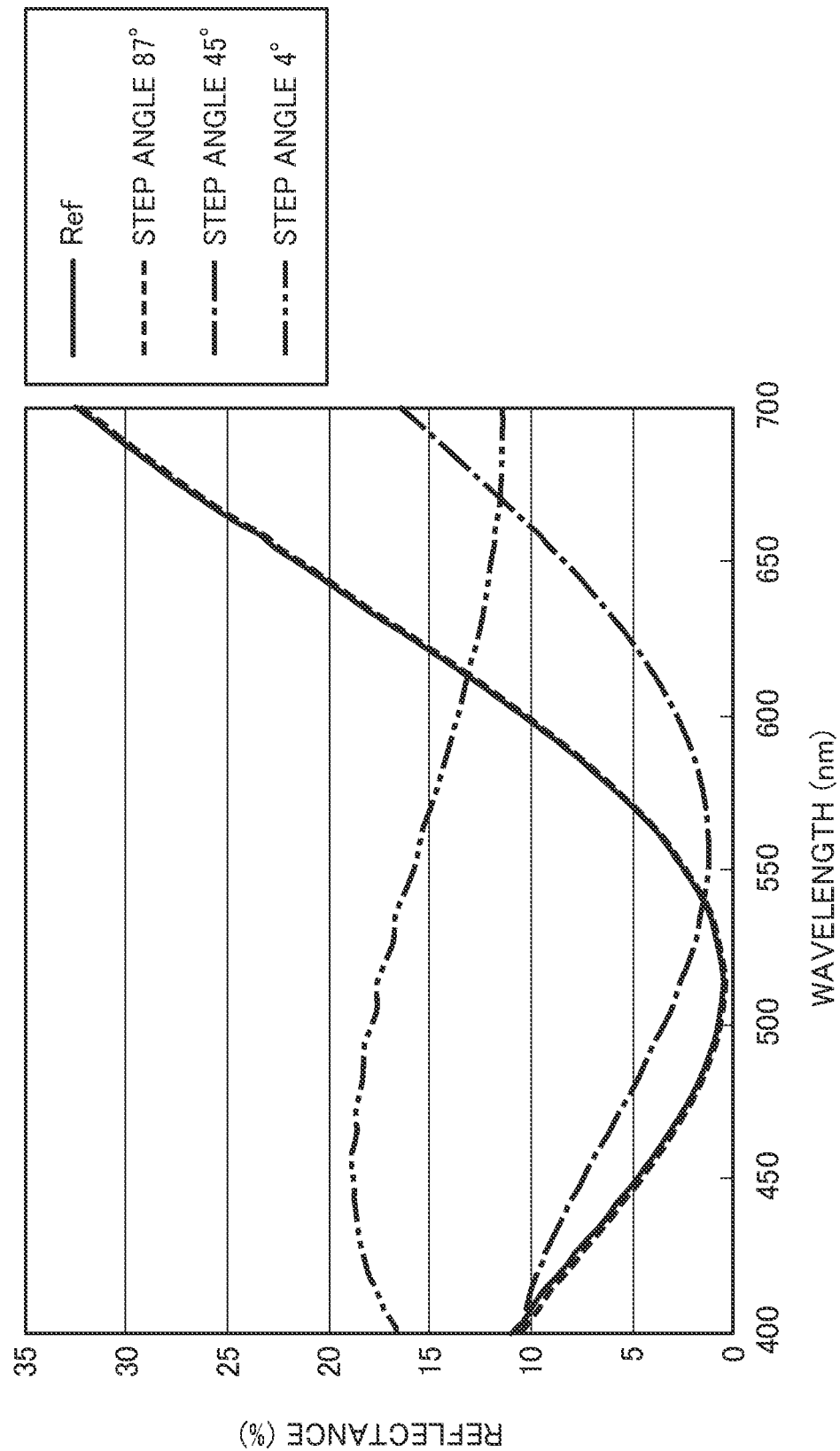
FIG. 11 is graph showing results of verifying the relationships between wavelengths and absorption-axis reflectances of the polarizing plates according to Examples 1, 2 and 5, and Comparative Example 1.

FIG. 10 shows results of verifying the relationships between wavelengths and absorption-axis transmittances of polarizing plates according to Examples 1, 2 and 5, and Comparative Example 1. FIG. 11 shows results of verifying the relationships between wavelengths and absorption-axis reflectances of polarizing plates according to Examples 1, 2 and 5, and Comparative Example 1. FIG. 12 shows the relationship between step angles and absorption-axis reflectances (Rs), at wavelengths of 520 to 590 nm, of polarizing plates according to Examples 1 to 5, and Comparative Example 1.

In FIG. 10, the abscissa axis indicates the wavelength λ (nm), and the ordinate axis indicates the absorption-axis transmittance (%). Here, the absorption-axis transmittance means the transmittance of polarization (TE waves) in the absorption axis direction (Y-axis direction) incident on the polarizing plate. In FIG. 10, graphs indicated by broken lines represent the results of the polarizing plates 100 of the present invention serving as Examples. The graph (Ref) indicated by a solid line represents the result of the polarizing plate 200 serving as Comparative Example.

In FIG. 11, the abscissa axis indicates the wavelength λ (nm), and the ordinate axis indicates the absorption-axis reflectance (%). Here, the absorption-axis reflectance means the reflectance of polarization (TE waves) in the absorption axis direction (Y-axis direction) incident on the polarizing plate. In FIG. 11, graphs indicated by broken lines represent the results of the polarizing plates 100 of the present invention serving as Examples. The graph (Ref) indicated by a solid line represents the result of the polarizing plate 200 serving as Comparative Example.

As shown in FIG. 11, in the polarizing plate 100 having the structure shown in FIG. 1, as the step angle θs is reduced from 87°, the absorption-axis reflectance over the entire visible range tends to decrease (around 45°). As the step angle θs is further reduced, the transmission-axis reflectance with the wavelength of 650 nm or less tends to increase.

As shown in FIG. 12, it is found that the absorption-axis reflectance (Rs) at an step angle θ of 90° is 3.5, and the range with the absorption-axis reflectance (Rs) being less than 3.5 is a range of 15°<θ<90°. Consequently, it is preferable that the step angle θ in the polarizing plate of the present invention be in a range of 15°<θ<90°.

EXPLANATION OF REFERENCE NUMERALS 100, 200, 300, 400, 500, 600, 700, 800, 900 Polarizing plate
1 Transparent substrate
2 Second dielectric layer
3 Reflective layer
4 Dielectric layer
5 Absorption layer
6 Third dielectric layer
7 Film thickness of second dielectric layer
8 Film thickness of reflective layer
9 Film thickness of dielectric layer
10 Film thickness of absorption layer
11 Film thickness of third dielectric layer
10 Step
20 Grid-like projection portions
L Incident light
P Pitch of grid-like projection portions
W Line width
S Space width
H Engraved amount
Hs Step height
Ws Width of metal layer top

The invention claimed is:

1. A polarizing plate having a wire grid structure, comprising:
a transparent substrate; and
a plurality of grid-like projection portions that are arranged on the transparent substrate at a pitch shorter than a wavelength of light in a used bandwidth, and extend in a predetermined direction,
wherein the plurality of grid-like projection portions each having a reflective layer, an absorption layer, and a dielectric layer in order from the transparent substrate side,
wherein the reflective layer, when viewed in the predetermined direction, comprises:
a rectangle portion having a bottom on the transparent substrate side, and
a shape with a first width changing in a continuous manner,
wherein the bottom of the rectangle portion has a second width that is largest,
wherein the dielectric layer and the absorption layer, when viewed in the predetermined direction, are rectangular and have a third width that is the same as the second width of the bottom of the rectangle portion of the reflective layer, and
wherein the shape of the reflective layer is formed of a curved line.

2. The polarizing plate according to claim 1, wherein the transparent substrate is transparent to the wavelength of the light in the used bandwidth, and is made of glass, quartz, or sapphire.

3. The polarizing plate according to claim 1, wherein the reflective layer is made of aluminum, or an aluminum alloy.

4. The polarizing plate according to claim 1, wherein the dielectric layer is made of Si oxide.

5. The polarizing plate according to claim 1, wherein the absorption layer contains Fe, or Ta, and further contains Si.

6. The polarizing plate according to claim 1, wherein a surface of the polarizing plate on which light is incident is covered with a protective film made of a dielectric material.

7. The polarizing plate according to claim 1, wherein a surface of the polarizing plate on which light is incident is covered with an organic water-repellent film.

8. An optical device, comprising the polarizing plate according to claim 1.

9. A method of manufacturing a polarizing plate having a wire grid structure, comprising:
a reflective layer forming step of forming a reflective layer on one surface of a transparent substrate;
a dielectric layer forming step of forming a dielectric layer on one surface of the reflective layer farther from the transparent substrate;
an absorption layer forming step of forming an absorption layer on one surface of the dielectric layer farther from the reflective layer; and
an etching step of forming a plurality of grid-like projection portions arranged on the transparent substrate at a pitch shorter than a wavelength of light in a used bandwidth, and extending in a predetermined direction, by selectively etching a formed laminate,
wherein the etching step comprises isotropic etching and anisotropic etching to etch the reflective layer on which the plurality of grid-like projection portions are formed,
wherein the reflective layer, when viewed in the predetermined direction, comprises:
a rectangle portion having a bottom on the transparent substrate side, and
a shape with a first width changing in a continuous manner,
wherein the bottom of the rectangle portion has a second width that is largest,
wherein the dielectric layer and the absorption layer, when viewed in the predetermined direction, are rectangular and have a third width that is the same as the second width of the bottom of the rectangle portion of the reflective layer, and
wherein the shape of the reflective layer is formed of a curved line.

* * * * *